United States Patent
Chen et al.

(10) Patent No.: US 10,457,015 B1
(45) Date of Patent: Oct. 29, 2019

(54) MESH MATERIAL FOR FLEXIBLE STRUCTURES AND METHODS OF FABRICATING SAME

(71) Applicant: Tru-View LLC, Wichita, KS (US)

(72) Inventors: Hao Chen, Shanghai (CN); Chieh-Yu Chen, Taipei (TW)

(73) Assignee: Tru-View LLC, Wichita, KS (US)

( * ) Notice: Subject to any disclaimer, the term of this patent is extended or adjusted under 35 U.S.C. 154(b) by 0 days.

(21) Appl. No.: 16/245,508

(22) Filed: Jan. 11, 2019

(51) Int. Cl.
| | |
|---|---|
| *B32B 5/02* | (2006.01) |
| *D03D 1/00* | (2006.01) |
| *D03D 15/00* | (2006.01) |
| *D03D 15/08* | (2006.01) |
| *B32B 27/12* | (2006.01) |
| *E04H 15/32* | (2006.01) |
| *E04H 15/00* | (2006.01) |
| *E06B 9/24* | (2006.01) |
| *A01M 31/02* | (2006.01) |

(52) U.S. Cl.
CPC .............. *B32B 5/028* (2013.01); *B32B 27/12* (2013.01); *D03D 1/0047* (2013.01); *D03D 15/0033* (2013.01); *D03D 15/08* (2013.01); *E04H 15/32* (2013.01); *A01M 31/025* (2013.01); *B32B 5/024* (2013.01); *B32B 2307/40* (2013.01); *B32B 2307/712* (2013.01); *E04H 15/001* (2013.01); *E06B 9/24* (2013.01)

(58) Field of Classification Search
CPC ......... B32B 5/028; B32B 27/12; B32B 5/024; B32B 2307/40; B32B 2307/712
See application file for complete search history.

(56) References Cited

U.S. PATENT DOCUMENTS

| | | | | |
|---|---|---|---|---|
| 6,734,125 | B2 * | 5/2004 | Veiga | B32B 27/04 139/384 R |
| 7,824,748 | B2 * | 11/2010 | Dalvey | B41M 5/0256 428/32.69 |
| 2017/0156340 | A1 * | 6/2017 | Toreki | D06M 11/44 |

FOREIGN PATENT DOCUMENTS

WO WO-2017095335 A1 * 6/2017 ............. A01N 25/28

OTHER PUBLICATIONS

Akovali, Guneri, Chapter 1: Thermoplastic polymers used in textile coatings, from: Advances in Polymer Coated Textiles, Smithers Rapra Technology Ltd, 2012, pp. 1-24. (Year: 2012).*

* cited by examiner

*Primary Examiner* — Kelly M Gambetta
(74) *Attorney, Agent, or Firm* — Hovey Williams LLP

(57) ABSTRACT

A mesh material for fabricating hunting blinds, tents, and other similar flexible structures. The material is durable, water-resistant, and partially light-transmissive such that persons or objects inside or behind the structures are not easily seen from outside the structures. The material is also semi-permeable to air flow for ventilation purposes. The mesh material is fabricated from an interwoven polyester fabric that is coated with acrylic and a mixture of silicone and ethylene vinyl acetate (EVA). Patterns and/or colors are printed on both sides of the fabric with a heat transfer paper printing process to provide a desired level of light transmissivity.

6 Claims, 4 Drawing Sheets

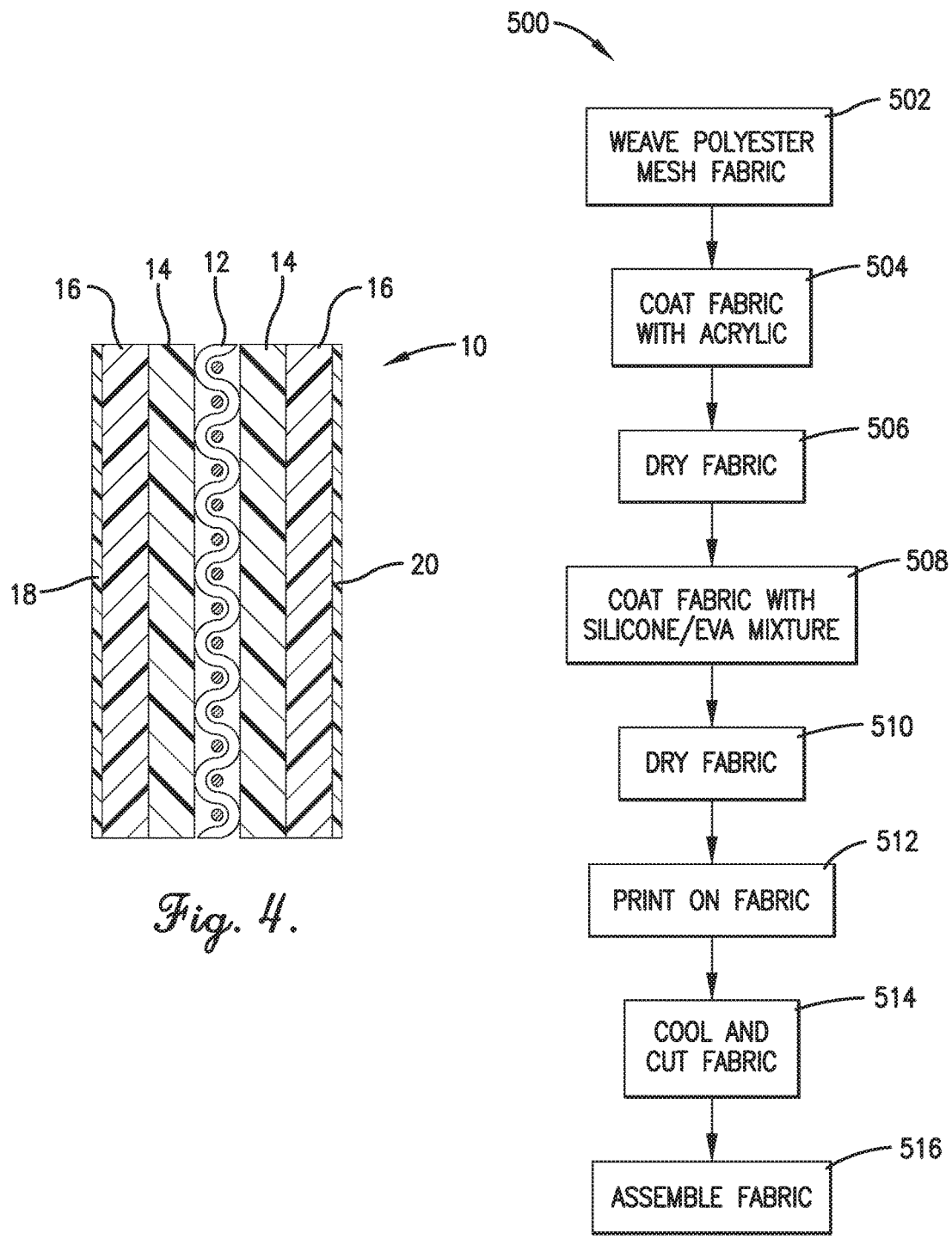

MESH MATERIAL FOR FLEXIBLE STRUCTURES AND METHODS OF FABRICATING SAME

BACKGROUND

Hunting blinds, tents, and other similar structures are typically formed of flexible yet durable and water-resistant materials. Many different types of materials have been used to form such structures, but all of them suffer from limitations that limit their utility.

SUMMARY

The present invention provides a distinct advance in the art of hunting blinds, tents, and other similar flexible structures by providing a novel and improved mesh material that may be used to fabricate such structures and novel and improved methods of fabricating such mesh material.

An embodiment of the mesh material broadly comprises an underlying fabric formed from interwoven polyester yarns; a layer of acrylic on both sides of the fabric; and another layer of silicone and ethylene vinyl acetate (EVA) over the acrylic layer. The mesh material also comprises patterns and/or dark colors printed on both sides of the coated fabric. The fabric, coatings, and printings make the mesh material durable, water-resistant, and partially light-transmissive such that persons or objects inside or behind structures made from the material are not seen from outside the structures. The material is also semi-permeable to air flow for ventilation purposes.

The above-described mesh material and other embodiments of the mesh material may be made by first weaving polyester yarns into the underlying fabric. The yarns are woven to create a mesh with apertures or voids of a selected size. In one embodiment, the yarns are woven to create apertures approximately 1.2 mm×1.2 mm. Both sides of the fabric are then coated with acrylic. The acrylic-coated fabric is then dried and pressed to more securely bond and set the acrylic. Both sides of the acrylic-coated fabric are then coated with a mixture of silicone and EVA to improve the fabric's tenacity and reduce seam slippage. The coated fabric is then again dried and pressed to adhere and bond the silicone/EVA layer on top of the acrylic layer.

The coated fabric is then printed on both sides with a heat transfer paper printing process. In one embodiment, a camouflage pattern is printed on one side of the coated fabric and a black or other dark color is printed on the opposite side of the coated fabric. The transfer printing process may be carried out continuously on a heated roller, cylindrical screen, by means of a heated platen, or with the use of steam or dry, warm air under atmospheric pressure or in vacuo.

In one embodiment, blank transfer papers are first printed by engraved rotary screens that are dipped in color tanks. Two sets of transfer papers are preferably used: one set printed with a camouflage pattern and another printed with a black or other dark solid color. Once the transfer papers are printed by the rotary screens, the papers are dried. The patterns on the heat transfer papers are then transferred to the coated fabric through a sublimation heat transfer machine.

The mesh material is then cooled, rolled up, and subsequently cut into a desired width so it may be used to fabricate hunting blinds, tents, awnings, or other flexible structures. The resultant mesh material is sturdy, durable, water-resistant, and partially transmissive such that a portion of incident radiation directed at a first side of the mesh material is reflected off the material so that a person or object behind the second side of the material is not easily seen by animals or persons on the first side of the material. The mesh material also has an aperture density that makes it semi-permeable to air flow.

Coating the mesh fabric in acrylic and silicone/EVA as described above rather than PVC is important because the acrylic and silicone/EVA coated fabric is able to withstand temperatures up to almost 230 C without melting, whereas PVC would start melting at temperature of 180 C. Thus, PVC coated fabric cannot be printed with the above-described heat transfer printing process, as heat transfer printing normally reaches up to 220 C in order to successfully transfer printing from the transfer paper to the fabric.

In the above-described embodiments of the invention, the acrylic layer and silicone/EVA layer are applied to the fabric after the fabric is woven. In another embodiment, acrylic and silicone/EVA may be applied to the yarns before they are woven into the fabric.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 4 is a cross-sectional view of the mesh material of FIG. 2 with its layers enlarged and not necessarily to scale;

FIG. 5 is a flow diagram that depicts certain steps of a method of fabricating the mesh material of FIG. 2 and other embodiments of the mesh material.

Figure 1:
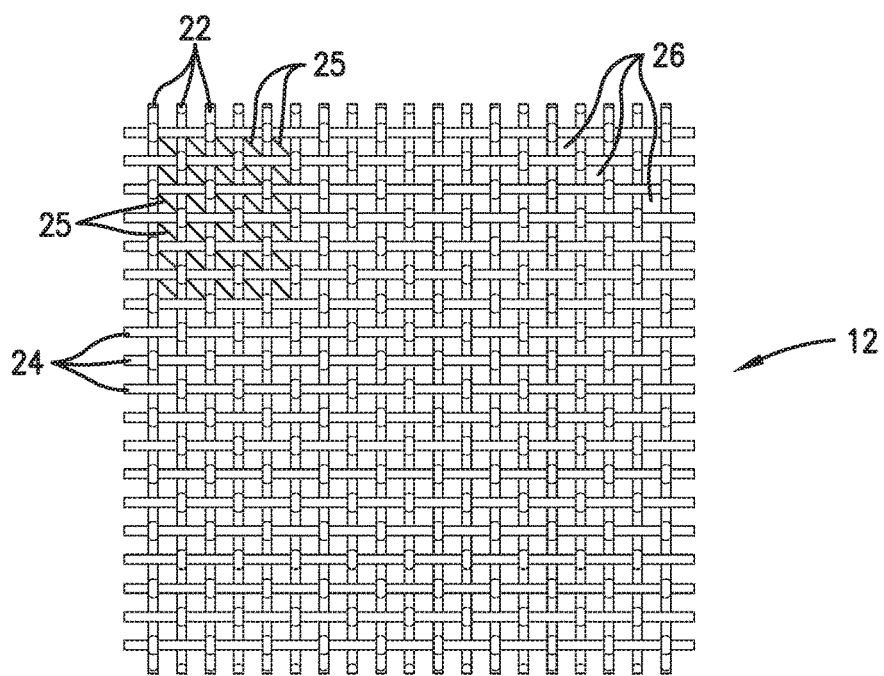
FIG. 1 is a front elevational view of a piece of interwoven polyester fabric that forms a part of the mesh material of FIG. 2.

The drawing figures do not limit the present invention to the specific embodiments disclosed and described herein. The drawings are not necessarily to scale, emphasis instead being placed upon clearly illustrating the principles of the invention.

DETAILED DESCRIPTION

The present invention provides a novel and improved mesh material for use in forming the walls, ceilings, and/or other surfaces of hunting blinds, tents, awnings, and other similar structures. The mesh material is durable, water-resistant, and partially light-transmissive such that persons or objects inside or behind the structures are not seen from outside the structures and semi-permeable to air flow for ventilation purposes.

Figure 2:
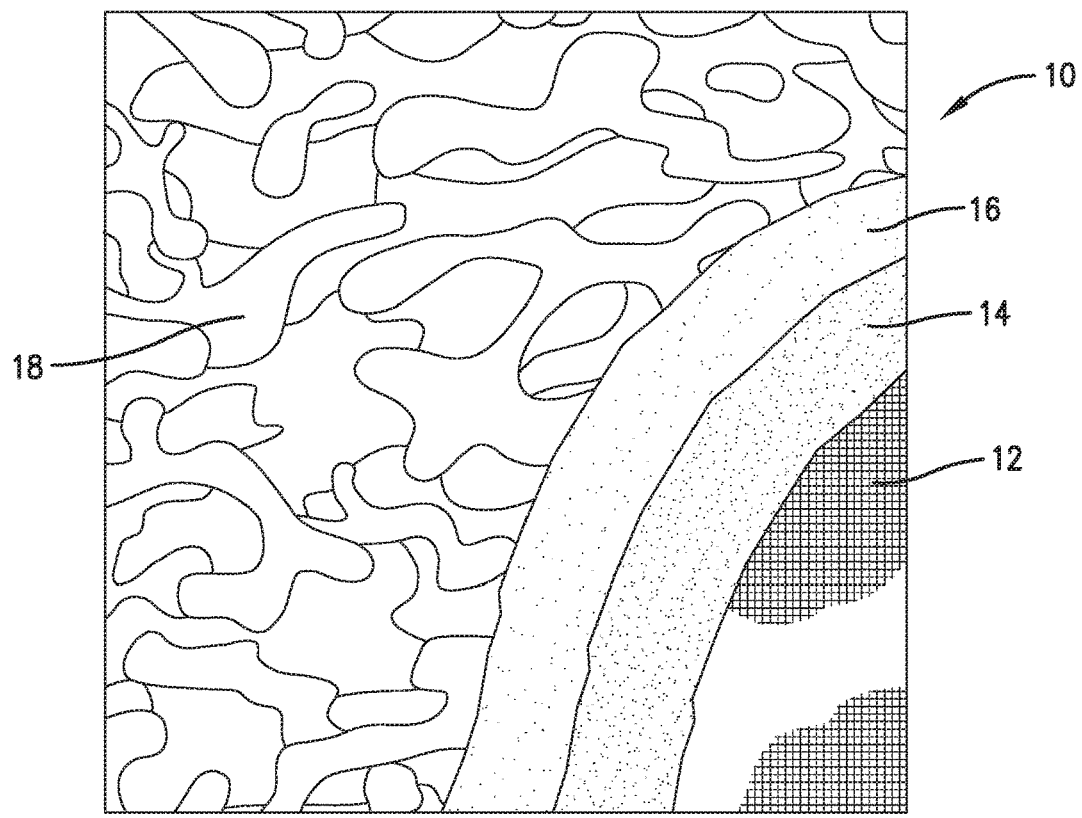
FIG. 2 is a front elevational view of a piece of mesh material constructed in accordance with embodiments of the present invention with portions of its layers hidden to reveal underlying layers.
Figure 3:
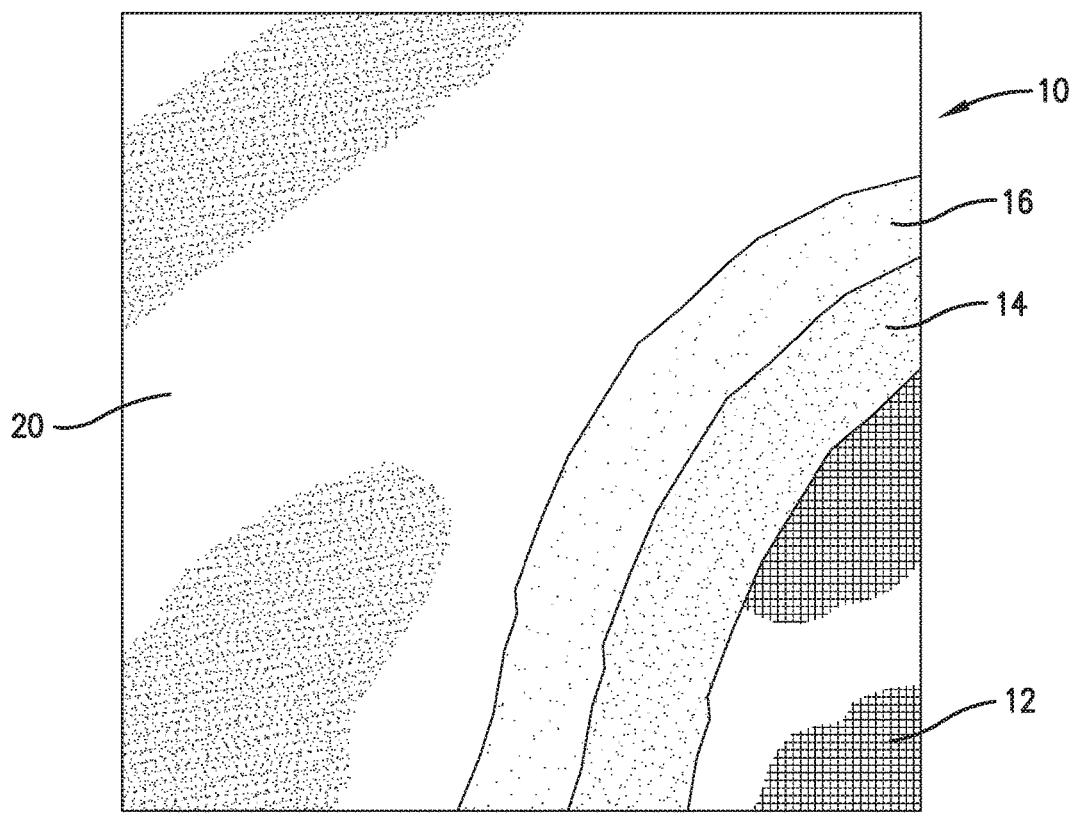
FIG. 3 is a rear elevational view of the mesh material of FIG. 2 with portions of its layers hidden to reveal underlying layers.

Referring initially to FIGS. 2-4, an embodiment of the mesh material 10 broadly comprises an underlying fabric 12 formed from interwoven polyester yarns; an acrylic layer 14 on both sides of the fabric 12; a silicone and ethylene vinyl acetate (EVA) layer 16 on both sides of the fabric over the acrylic layer 14; a pattern 18 printed on one side of the fabric; and a dark color 20 printed on the opposite side of the fabric.

A piece of the underlying fabric 12 is illustrated in FIG. 1. The fabric is woven from warp 22 and weft 24 polyester yarns into a mesh having a grid of generally square-shaped apertures or voids 26. In one embodiment, the apertures 26 are approximately 0.8-1.5 mm×0.8-1.5 mm. In one particular embodiment, the apertures are 1.2 mm×1.2 mm. This aperture size and density makes the mesh material partially light transmissive and semi-permeable to air flow as described below. In one embodiment, the aperture density of the material causes the material to block less than 50% of the air that strikes it.

The warp and weft yarns 22, 24 of the fabric 12 have denier ratings of approximately 800-1200 d. The fabric may also include diagonal yarns 25 with denier ratings of 60 d-100 d. Denier is a unit of measurement that represents the fiber thickness of the yarns. Fabrics made with yarns with a high denier count tend to be thick, sturdy, and durable, whereas fabrics made with yarns with a low denier count tend to be sheer, soft, and silky.

Applicant has discovered that yarns with the above-described denier ratings and a resultant fabric with the above-described aperture size is ideal for creating embodiments of the mesh material 10.

As best shown in FIG. 4, the acrylic layer 14 covers both sides of the interwoven polyester fabric 12. The acrylic layer 14 may be formed with clear or white acrylic. Exemplary methods of applying the acrylic 14 to the fabric 12 are described below.

The silicone and EVA layer 16 covers the acrylic layer 14 on both sides of the fabric. The silicone/EVA layer may contain 35-40% silicone, 8-10% EVA, water, and trace amounts of other compounds. Exemplary methods of applying the silicone/EVA to the fabric are described below.

The pattern 18 and dark color 20 are printed over the silicone and EVA layer 16. In one embodiment, the pattern is a camouflage pattern, but it may be any desired pattern. Exemplary methods of applying the pattern 18 and dark color 20 are described below.

Figure 6:
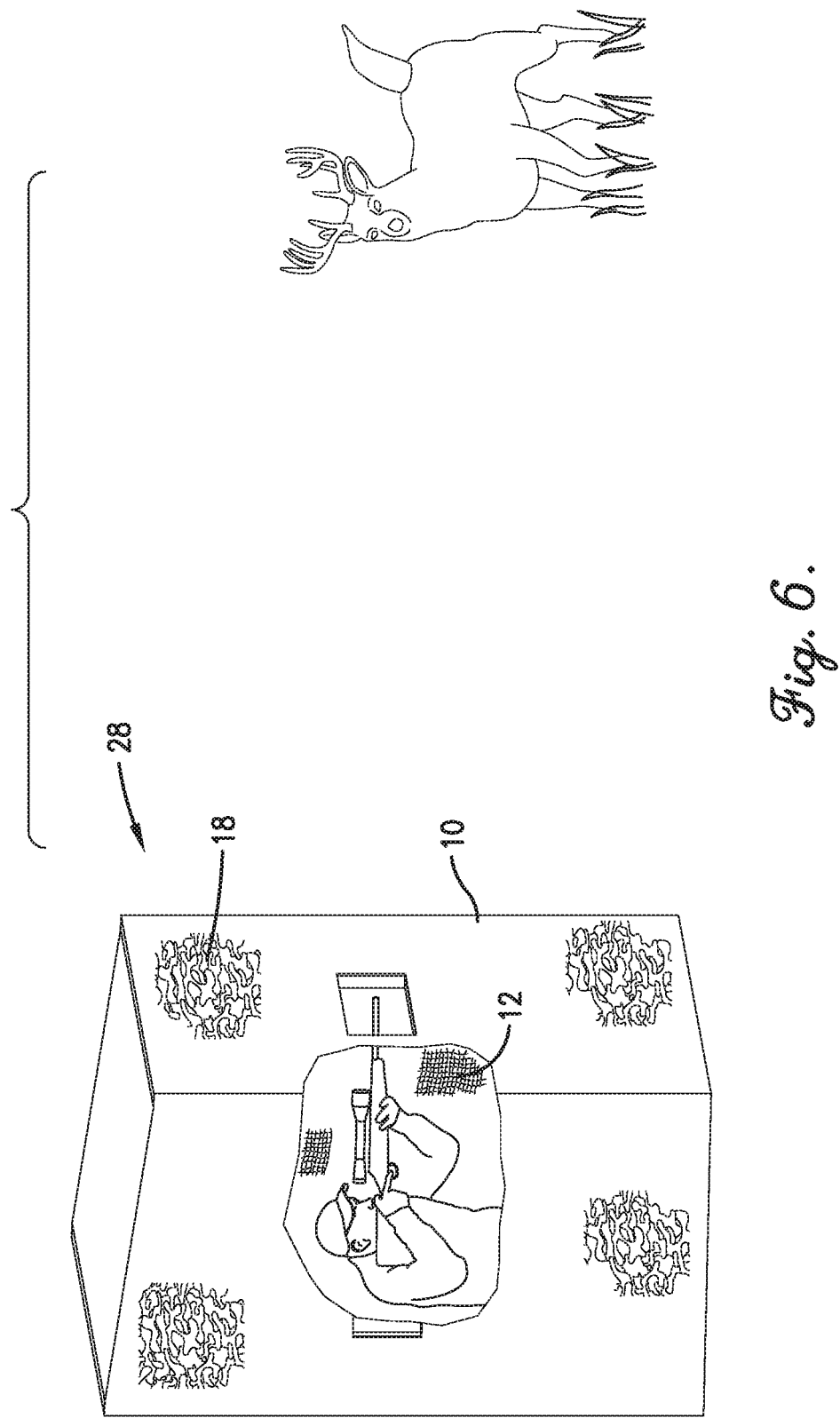
FIG. 6 is a perspective view of an exemplary hunting blind that may be fabricated with the mesh material of the present invention.

By forming the mesh material 10 with the above-described fabric 12, coatings 14, 16, and printings 18, 20, an optimal material light transmissivity is achieved. In one embodiment, the ratio of ambient light that is reflected from the pattern side of the mesh material ("reflected light") vs. how much light is transmitted though the inside of the material ("transmitted light") is greater than 1, and preferably greater than 1.5, such that more light is reflected from the outside of the fabric than passes through to the inside of the fabric (when the pattern side is the outside). This allows a hunter or other person inside a blind or other structure formed from the mesh material to see things outside the structure without being easily seen by game or persons outside the structure as depicted in FIG. 6.

Methods of fabricating the above-described mesh material 10 and other embodiments of the mesh material will now be described. The flow chart of FIG. 5 shows the steps and/or other functionality of one exemplary method 500. In some alternative embodiments, the functions noted in the various blocks may occur out of the order depicted in FIG. 5. For example, some of the steps depicted in the blocks and described below may be executed concurrently or in reverse order depending upon the functionality involved.

As shown in block 502, the method 500 begins with the creation of the underlying fabric layer 12. The fabric layer 12 is created by weaving the polyester yarn 22, 24 into a mesh with the illustrated apertures or voids 26. In one embodiment, the warp and weft yarns 22, 24 have a denier rating of approximately 800-1200 d, the diagonal yarns 25 have a denier rating of 60 d-100 d, and the apertures 26 are of approximately 1.2 mm×1.2 mm. In one embodiment, the fabric 12, before it is coated, weighs approximately 110-130 grams per square meter (gsm).

The interwoven polyester fabric 12 is then coated on both sides with the transparent or white acrylic 14 as shown in block 504. In one embodiment, the fabric 12 is coated with acrylic by dipping it into an acrylic-filled chemical tank. The acrylic is preferably in liquid form at a temperature between 20-50 C. In one embodiment, the dipping speed is approximately 5-20 m per minute.

The acrylic-coated fabric is then dried to more securely bond and set the acrylic 14 on the fabric 12 as shown in block 506. In one embodiment, the acrylic-coated fabric is dried by passing it through a heating chamber at a temperature of approximately 150-200 C. While in the heating chamber, the acrylic-coated fabric is also passed between two or more rollers where a pressure of 2-5 kg/m2 is applied to the fabric to firmly adhere the acrylic coating to the fabric. In one embodiment, the resultant acrylic-coated fabric weighs approximately 200-250 g/m2, with an ideal weight of approximately 230 g/m2 (within + or −5% range). In one embodiment, the acrylic-coated fabric weighs approximately 116-136 gsm.

The acrylic-coated fabric is then subjected to an enhancement process to strengthen the fabric and its yarns and to improve its tenacity and reduce seam slippage as shown in block 508. A fabric's tenacity is a measure of its specific strength. The specific strength is a fabric's strength, or force per unit area at failure, divided by its density. It is also commonly known as the strength-to-weight ratio. Seam slippage conventionally relates to one of two things: 1) when stress is applied to a seam, the yarns in the fabric slip out of the stitching causing an open seam; and 2) when stress is applied to a seam, the yarns in the fabric shift or slide in the weave construction causing seam grinning and fabric distortion. To improve its tenacity and reduce seam slippage, the acrylic-coated fabric is coated with a mixture of silicone and Ethylene Vinyl Acetate (EVA). In one embodiment, the fabric is coated with this mixture by dipping it into a chemical tank, where the mixture is in liquid form at a temperature between 20-50 C. In one embodiment, the dipping speed is approximately 5-20 m per minute.

The coated fabric is then dried to adhere and bond the silicone/EVA layer on top of the acrylic layer as shown in block 510. In one embodiment, the coated fabric is dried by passing it through a heating chamber at a temperature of approximately 120-200 C. While in the heating chamber, the coated fabric is also passed between two or more rollers where a pressure of 2-5 kg/m2 is applied to the fabric to firmly adhere the silicone/EVA coating on top of the acrylic layer. In one embodiment, the fabric weighs approximately 118-138 gsm with both the acrylic layer 14 and silicone/EVA layer.

The patterns 18 and/or dark colors 20 are then printed on both sides of the acrylic and silicone/EVA-coated fabric as shown in block 512. In one embodiment, the patterns and/or colors are printed with a heat transfer paper printing process. During the heat transfer printing process, the sublimation dyestuffs, in the form of water-based inks (very fine dispersions of organic pigments in water) are applied to transfer paper in image configuration by conventional printing techniques such as rotary screen printing, rotary gravure and the like, and then dried. To affect the transfer process, the transfer paper thus printed is brought into contact with the coated fabric and kept at a sublimation temperature under pressure until the image on the transfer paper has been transferred to the coated fabric. This can generally be achieved by a relatively short period of heating, e.g., from about 10 to 60 seconds at a temperature in the range of from about 150 to 240 C. at a pressure ranging from about 5 to 20 psi.

The transfer printing process may be carried out continuously on a heated roller, cylindrical screen or by means of a heated platen or with the use of steam or dry, warm air under atmospheric pressure or in vacuo. For example, in one embodiment, blank transfer papers are first printed by engraved rotary screens that are dipped in color tanks. Two sets of transfer papers are used: one set printed with a camouflage pattern and another printed with a black or other dark solid color. Once the transfer papers are printed by the rotary screens, the papers are dried. The patterns on the heat transfer papers are then transferred to the fabric through a sublimation heat transfer machine at a temperature of around 150-220 C for about 10-30 seconds. In one embodiment, the fabric weighs approximately 125-145 gsm with the acrylic layer, silicone/EVA layer, and the pattern 18 and dark color 20. This weight increase after printing is primarily due to fabric shrinkage during the heat transfer printing process described below.

Coating the mesh fabric in acrylic and silicone/EVA as described above rather than PVC is important because the acrylic-coated fabric is able to withstand temperatures up to almost 230 C without melting, whereas PVC would start melting at temperature of 180 C. Thus, PVC coated fabric cannot be printed with the above-described heat transfer printing process, as heat transfer printing normally reaches up to 200-220 C in order to successfully transfer printing from the transfer paper to the fabric.

As shown in block 514, the coated fabric is then cooled, rolled up, and subsequently cut into a desired width. Finally, as shown in block 516, the fabric may be assembled into a hunting blind, tent, awning, green house, or other flexible structure 28 as illustrated in FIG. 6.

In the above-described embodiments of the invention, the acrylic layer and silicone/EVA layer are applied to the fabric after the fabric is woven. In another embodiment, acrylic and silicone/EVA may be applied to the yarns before they are woven into the fabric.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:
1. A method of fabricating a hunting blind, the method comprising:
  weaving polyester yarn into a mesh fabric having a plurality of apertures;
  coating both sides of the mesh fabric with acrylic;
  drying the acrylic-coated fabric;
  coating both sides of the acrylic-coated fabric with a mixture of silicone and ethylene vinyl acetate (EVA);
  drying the acrylic-coated and silicone/EVA-coated fabric;
  printing a camouflage pattern on a first side of the acrylic-coated and silicone/EVA-coated fabric and printing a dark color on a second side of the acrylic-coated and silicone/EVA-coated fabric with a heat transfer printing process;
  cutting the printed fabric into a suitable size for the hunting blind; and
  assembling the cut fabric into the hunting blind.

2. The method as set forth in claim 1, wherein the acrylic-coated fabric is dried by passing it through a heating chamber at a temperature of approximately 150-200 C.

3. The method as set forth in claim 2, further comprising the step of pressing the acrylic-coated fabric between two rollers while the acrylic-coated fabric is dried to firmly adhere the acrylic coating to the fabric.

4. The method as set forth in claim 1, wherein the acrylic-coated and silicone/EVA-coated fabric is dried by passing it through a heating chamber at a temperature of approximately 150-200 C.

5. The method as set forth in claim 4, further comprising the step of pressing the acrylic-coated and silicone/EVA-coated fabric between two rollers while the acrylic-coated and silicone/EVA-coated fabric is dried to firmly adhere the and silicone/EVA coating to the fabric.

6. The method as set forth in claim 1, wherein the printing step further comprises printing the camouflage pattern on a first transfer paper, printing the dark color on a second transfer paper, and contacting the first and second transfer papers against the acrylic-coated and silicone/EVA-coated fabric.

\* \* \* \* \*

EX PARTE REEXAMINATION CERTIFICATE (11943rd)

United States Patent
Chen et al.

(10) Number: US 10,457,015 C1
(45) Certificate Issued: Nov. 10, 2021

(54) MESH MATERIAL FOR FLEXIBLE STRUCTURES AND METHODS OF FABRICATING SAME

(71) Applicant: Tru-View LLC, Wichita, KS (US)

(72) Inventors: Hao Chen, Shanghai (CN); Chieh-Yu Chen, Taipei (TW)

(73) Assignee: TRU-VIEW LLC, Wichita, KS (US)

Reexamination Request:
No. 90/014,714, Mar. 31, 2021

Reexamination Certificate for:
Patent No.: 10,457,015
Issued: Oct. 29, 2019
Appl. No.: 16/245,508
Filed: Jan. 11, 2019

(51) Int. Cl.
| | | |
|---|---|---|
| *B32B 5/02* | (2006.01) |
| *D03D 1/00* | (2006.01) |
| *D03D 15/00* | (2021.01) |
| *D03D 15/08* | (2006.01) |
| *B32B 27/12* | (2006.01) |
| *E04H 15/32* | (2006.01) |
| *E04H 15/00* | (2006.01) |
| *E06B 9/24* | (2006.01) |
| *A01M 31/02* | (2006.01) |
| *D03D 15/56* | (2021.01) |
| *D03D 15/54* | (2021.01) |

(52) U.S. Cl.
CPC .............. *B32B 5/028* (2013.01); *B32B 27/12* (2013.01); *D03D 1/0047* (2013.01); *D03D 15/54* (2021.01); *D03D 15/56* (2021.01); *E04H 15/32* (2013.01); *A01M 31/025* (2013.01); *B32B 5/024* (2013.01); *B32B 2307/40* (2013.01); *B32B 2307/712* (2013.01); *E04H 15/001* (2013.01); *E06B 9/24* (2013.01)

(58) Field of Classification Search
None
See application file for complete search history.

(56) References Cited

To view the complete listing of prior art documents cited during the proceeding for Reexamination Control Number 90/014,714, please refer to the USPTO's public Patent Application Information Retrieval (PAIR) system under the Display References tab.

*Primary Examiner* — Elizabeth L McKane

(57) ABSTRACT

A mesh material for fabricating hunting blinds, tents, and other similar flexible structures. The material is durable, water-resistant, and partially light-transmissive such that persons or objects inside or behind the structures are not easily seen from outside the structures. The material is also semi-permeable to air flow for ventilation purposes. The mesh material is fabricated from an interwoven polyester fabric that is coated with acrylic and a mixture of silicone and ethylene vinyl acetate (EVA). Patterns and/or colors are printed on both sides of the fabric with a heat transfer paper printing process to provide a desired level of light transmissivity.

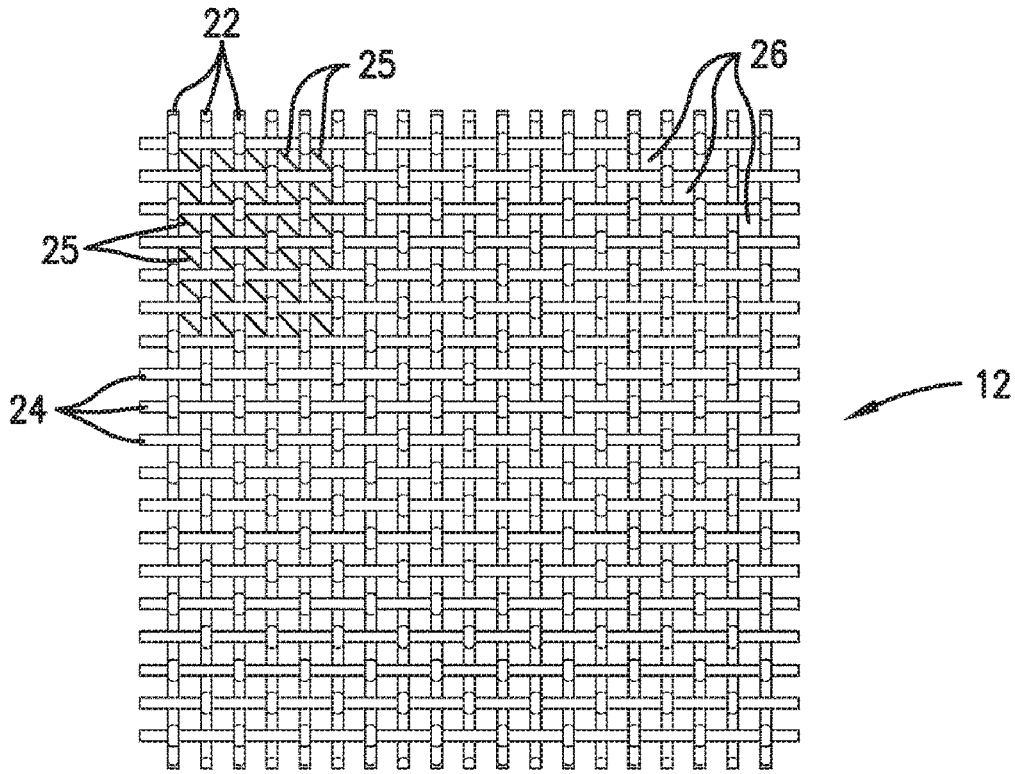

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3 and 5 are determined to be patentable as amended.

Claims 2, 4 and 6, dependent on an amended claim, are determined to be patentable.

New claims 7-12 are added and determined to be patentable.

1. A method of fabricating a hunting blind, the method comprising:
   weaving polyester yarn into a mesh fabric having a plurality of apertures *each having a size of between approximately 0.8 mm to approximately 1.5 mm by between approximately 0.8 mm to approximately 1.5 mm, wherein warp and weft yarns of the fabric have denier ratings of between approximately 800 d and approximately 1200 d and diagonal yarns of the fabric have denier ratings of between approximately 60 d and approximately 100 d*;
   coating both sides of the mesh fabric with acrylic *thereby forming an acrylic layer on both sides of the fabric*;
   drying the acrylic-coated fabric;
   coating both sides of the acrylic-coated fabric with a mixture of silicone and ethylene vinyl acetate (EVA) *thereby forming a silicone/EVA layer between 35 percent and 40 percent silicone, between 8 percent and 10 percent EVA*, and water on both sides of the fabric;
   drying the acrylic-coated and silicone/EVA-coated fabric;
   printing a camouflage pattern on a first side of the acrylic-coated and silicone/EVA-coated fabric and printing a dark color on a second side of the acrylic-coated and silicone/EVA-coated fabric with a heat transfer printing process *such that a material light transmissivity of the printed fabric is greater than 1.5 and such that the printed fabric weighs between approximately 125 gsm and approximately 145 gsm*;
   cutting the printed fabric into a suitable size for the hunting blind; and
   assembling the cut fabric into the hunting blind.

3. The method as set forth in claim 2, further comprising the step of pressing the acrylic-coated fabric between two rollers *thereby applying a pressure of between 2 kg/m² and 5 kg/m² while the acrylic-coated fabric is dried to firmly adhere the acrylic coating to the fabric*.

5. The method as set forth in claim 4, further comprising the step of pressing the acrylic-coated and silicone/EVA-coated fabric between two rollers *thereby applying a pressure of between 2 kg/m² and 5 kg/m² while the acrylic-coated and silicone/EVA-coated fabric is dried to firmly adhere the* [and] silicone/EVA coating to the fabric.

7. *A method of fabricating a hunting blind, the method comprising:*
   *weaving polyester yarn into a mesh fabric having a plurality of apertures each having a size of between approximately 0.8 mm to approximately 1.5 mm by between approximately 0.8 mm to approximately 1.5 mm, wherein warp and weft yarns of the fabric have denier ratings of between approximately 800 d and approximately 1200 d and diagonal yarns of the fabric have denier ratings of between approximately 60 d and approximately 100 d;*
   *coating both sides of the mesh fabric with acrylic having a temperature of between 20 degrees Celsius and 50 degrees Celsius via dipping the mesh fabric in the acrylic at a dipping speed of between approximately 5 meters per minute and approximately 20 meters per minute thereby forming an acrylic layer on both sides of the fabric;*
   *drying the acrylic-coated fabric so that the acrylic-coated fabric weighs between approximately 116 gsm and approximately 136 gsm;*
   *coating both sides of the acrylic-coated fabric with a mixture of silicone, ethylene vinyl acetate (EVA), and water having a temperature of between 20 degrees Celsius and 50 degrees Celsius via dipping the acrylic-coated fabric in the silicone, EVA, and water mixture at a dipping speed of between approximately 5 meters per minute and approximately 20 meters per minute thereby forming a silicone/EVA layer between 35 percent and 40 percent silicone and between 8 percent and 10 percent EVA on both sides of the fabric;*
   *drying the acrylic-coated and silicone/EVA-coated fabric so that the acrylic-coated and silicone/EVA-coated fabric weighs between approximately 118 gsm and approximately 138 gsm;*
   *printing a camouflage pattern on a first side of the acrylic-coated and silicone/EVA-coated fabric and printing a dark color on a second side of the acrylic-coated and silicone/EVA-coated fabric with a heat transfer printing process at a temperature of between 150 degrees Celsius and 240 degrees Celsius at a pressure of between 5 psi and 20 psi for between 10 seconds and 60 seconds such that a material light transmissivity of the printed fabric is greater than 1.5 and such that the printed fabric weighs between approximately 125 gsm and approximately 145 gsm;*
   *cooling the printed fabric;*
   *cutting the printed fabric into a suitable size for the hunting blind; and*
   *assembling the cut fabric into the hunting blind.*

8. *The method as set forth in claim 7, wherein the acrylic-coated fabric is dried by passing it through a heating chamber at a temperature of approximately 150-200C.*

9. *The method as set forth in claim 8, further comprising the step of pressing the acrylic-coated fabric between two rollers thereby applying a pressure of between 2 kg/m² and 5 kg/m² while the acrylic-coated fabric is dried to firmly adhere the acrylic coating to the fabric.*

10. *The method as set forth in claim 7, wherein the acrylic-coated and silicone/EVA-coated fabric is dried by passing it through a heating chamber at a temperature of approximately 150-200C.*

11. *The method as set forth in claim 10, further comprising the step of pressing the acrylic-coated and silicone/EVA-coated fabric between two rollers thereby applying a pressure of between 2 kg/m² and 5 kg/m² while the acrylic-coated and silicone/EVA-coated fabric is dried to firmly adhere the silicone/EVA coating to the fabric.*

12. *The method as set forth in claim 7, wherein the printing step further comprises printing the camouflage pattern on a first transfer paper, printing the dark color on*

*a second transfer paper, and contacting the first and second transfer papers against the acrylic-coated and silicone/EVA-coated fabric.*

\* \* \* \* \*